United States Patent
Schumacher et al.

(10) Patent No.: US 7,536,573 B2
(45) Date of Patent: May 19, 2009

(54) POWER BUDGETING FOR COMPUTERS

(75) Inventors: Derek Steven Schumacher, Auburn, CA (US); Idis Ramona Martinez, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 438 days.

(21) Appl. No.: 11/193,211

(22) Filed: Jul. 29, 2005

(65) Prior Publication Data

US 2007/0028130 A1  Feb. 1, 2007

(51) Int. Cl.
  G06F 1/00 (2006.01)
  G06F 1/32 (2006.01)
  G06F 11/30 (2006.01)
(52) U.S. Cl. .................. 713/320; 713/300; 713/340
(58) Field of Classification Search .......... 713/320, 713/300, 340
  See application file for complete search history.

(56) References Cited

U.S. PATENT DOCUMENTS

| | | | |
|---|---|---|---|
| 6,925,573 B2 * | 8/2005 | Bodas | 713/320 |
| 7,050,798 B2 * | 5/2006 | Ranta | 455/423 |
| 2004/0034749 A1 | 2/2004 | Jeddeloh | |
| 2004/0225801 A1 | 11/2004 | Scordalakes et al. | |
| 2004/0225802 A1 | 11/2004 | Krishnamurthy et al. | |
| 2004/0260853 A1 | 12/2004 | Cho | |
| 2006/0149978 A1 * | 7/2006 | Randall et al. | 713/300 |
| 2006/0156041 A1 * | 7/2006 | Zaretsky et al. | 713/300 |

* cited by examiner

*Primary Examiner*—Thomas Lee
*Assistant Examiner*—Michael J Brown

(57) ABSTRACT

A computer system uses power-consumption monitors for each of plural sets of devices. A power budget arbiter determines whether a collective power-consumption criterion is met at least in part as a function of said power-consumption data.

11 Claims, 2 Drawing Sheets

POWER BUDGETING FOR COMPUTERS

BACKGROUND OF THE INVENTION

The present invention relates to computers and, more particularly, to power budgeting for computers. In this specification, related art labeled "prior art" is admitted prior art; related art not labeled "prior art" is not admitted prior art.

Computers typically include processors, solid-state and disk-based memory, input-output devices and interfaces therefor. Moreover, many computers are expandable and/or upgradeable. Accordingly, computers are typically provided with power supplies that can not only handle the maximum power required by the computer in its initial configuration, but also allow leeway for added and upgraded components that may require additional power. Generally, the power supply for a computer can be selected to handle the total of the maximum power required of the pre-installed components plus a margin for added and upgraded components.

SUMMARY OF THE INVENTION

In the course of the present invention, it was recognized that budgeting power to meet maximum demands can be wasteful as not all components are operated at maximum power at all times. This is all the more the case as some manufacturers assign a nominal maximum power requirement higher than actual maximum power requirements, e.g., to avoid blame when failures occur due to insufficient power.

Accordingly, the present invention, as defined in the claims, provides for dynamically budgeting power as a function of power consumption as indicated by power monitors. Generally, the invention provides a more favorable tradeoff between cost (e.g., relating to the power supply and heat removal) and functionality. These and other features and advantages of the invention are apparent from the description below with reference to the following drawings.

DETAILED DESCRIPTION

Figure 1:
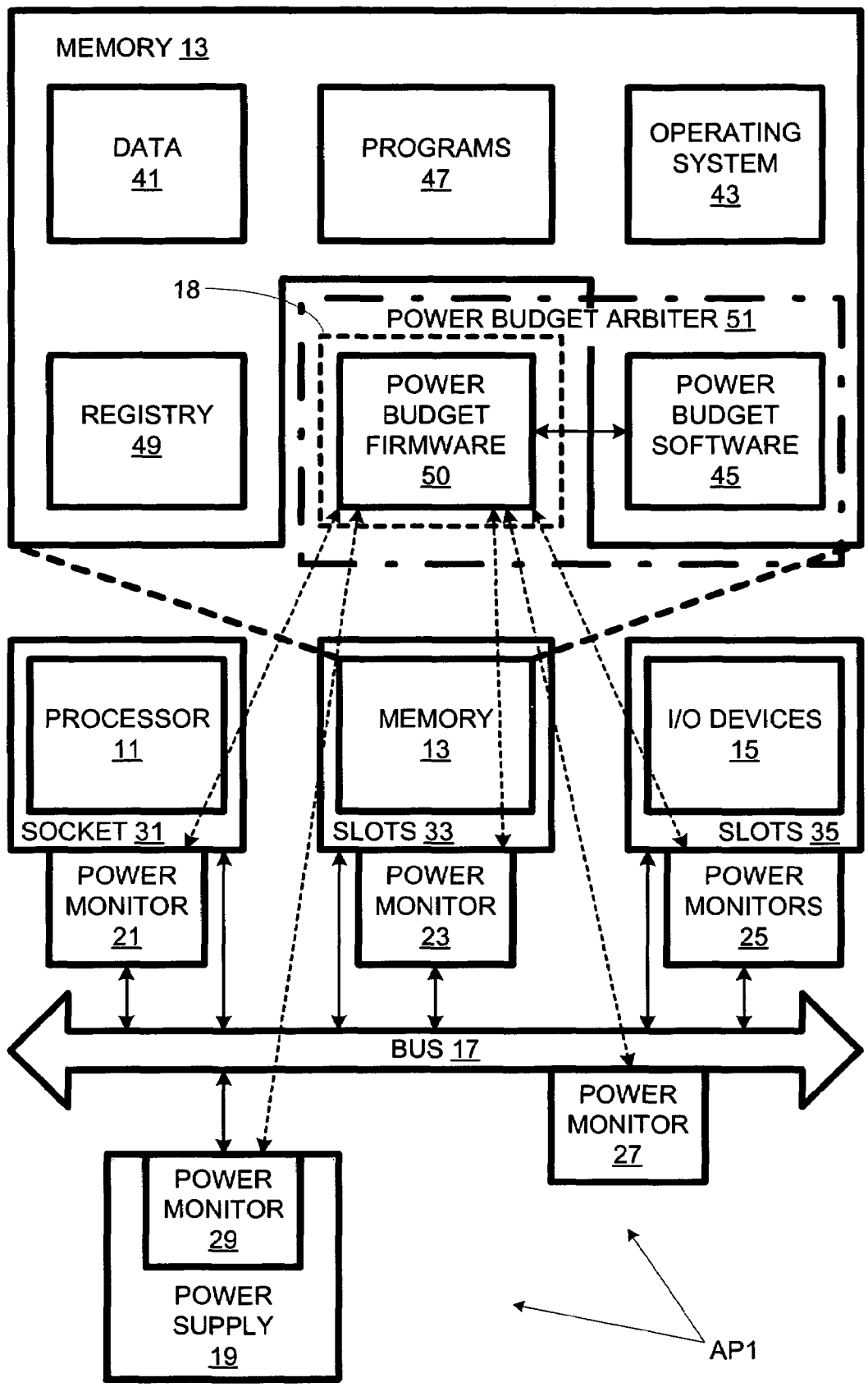
FIG. 1 is a schematic diagram of a computer system incorporating one of many processor modules within the scope of the invention.

One of many possible systems provided for by the present invention, host computer system AP1 comprises a data processor 11, memory 13, input/output (I/O) devices 15, bus 17, firmware 18, and power supply 19. Associated with each of these components is a respective power monitor 21, 23, 25, 27, 29. In the case of power supply 19, the respective power monitor 29 is built in. In the case of bus 17, the respective power monitor 27 is permanently associated. Processor 11, memory 13, and I/O devices 15, which are modularly designed for easy installation and replacement, have power monitors associated with host system connectors, e.g., processor socket 31, memory slots 33, and I/O card slots 35. Thus, system AP1 provides for processors, memory, and I/O devices without dedicated power monitors. Alternative embodiments of the invention employ such components with built-in power monitors.

Memory 13 includes both solid-state and disk-based memory; power monitor 23 monitors the power consumed by solid-state memory in memory slots 33, of which there are four in system AP1. In other embodiments, the number of slots differs; also, some embodiments have memory that is not connected to the system via memory slots. In another embodiment, each memory slot has its own power monitor; in another alternative embodiment, memory slots are grouped, with each group having a power monitor. Also, the invention provides for power monitors for hard disks and other disk-based devices.

I/O devices 15 include disk interfaces, network interfaces, printer ports, display ports, keyboard ports, etc. Each of these has its own power monitor. In some cases, e.g., for a display, the device to which the interface connects has its own power supply. However, some interfaces connect to devices that draw power from the interface, e.g., some USB (Universal Serial Bus, available from Intel Corporation) devices draw power via a USB connector on a USB I/O card.

Memory 13 stores data 41 to be manipulated by processor 11, an operating system 43, power budget arbiter software 45, other programs 47 of instructions for manipulating data 41, and a program registry 49. Programs 47 includes applications that provide user interfaces; other included programs are hidden, e.g., drivers. Power budget software 45 normally runs in the background except when it issues a warning or offers the user options for power budgeting.

Power budgeter arbiter software 45 cooperates with power arbiter firmware 50 to constitute a power-budget arbiter 51. Arbiter 51 gathers power-consumption data from the power-consumption monitors and issues warnings when a power budget reaches some threshold close to 100% of the power allocated to the monitored devices. Arbiter software 45 responds to the warning by reading data from arbiter firmware 50 and generating a human-readable warning. Arbiter software 45 can be configured to change the mode of one or more monitored devices to address a warning automatically. Otherwise, arbiter software 45 gives guidance to a user on options for responding to the warning.

Processor 11, memory 13, and I/O devices 15 communicate with each other via bus 17. While bus 17 is illustrated as a unitary bus, it represents a collection of buses through which devices communicate. The buses can include a PCI bus, a cache bus, and a dedicated graphics bus. Power monitors 21-29 communicate with arbiter 51 via dedicated buses indicated by dotted lines to power budget firmware 50 in FIG. 1. This provides the capability to access information even when a failure has occurred in the subsystem and brought the interface down. Power budget software 45 can access power-consumption information from power-budget firmware 50, or by accessing power monitors 21-29 individually via bus 17.

Power monitors 21-29 differ to match the requirements of the devices they monitor. Processor 11 has over a hundred power and ground nodes. Power monitor 21 monitors a subset of these to obtain a statistical representation of the overall power consumption by processor 11. In an alternative embodiment, all power nodes of a processor are monitored. Power monitor 21 provides total power consumption data; alternative embodiments, break down the power consumption by node. Power monitor 21 associates power consumption data with time (e.g., date plus time of day) and configuration data for processor 11, including a multiplier setting and an indication of which parallel functional units of processor are active. The associated data is stored by power monitor 21, which has memory in the address space for processor 11. Accordingly, arbiter 51 can access power data for processor 11 using conventional read operations. In addition, arbiter 51 can write configuration data to power monitor 21, e.g., indicate which thresholds should be use to trigger warnings.

Memory power monitor 23 monitors four memory slots. It generates power data for each slot and associates it with the capacity and type of memory installed (if any), as well time data. I/O monitors 25 indicate the nature of any device connected to the interface. Also, if the connected device draws power from the interface, that contribution to power consumption is recorded. Power supply monitor 29 and bus monitor 27 both time-stamp power-consumption data.

Figure 2:
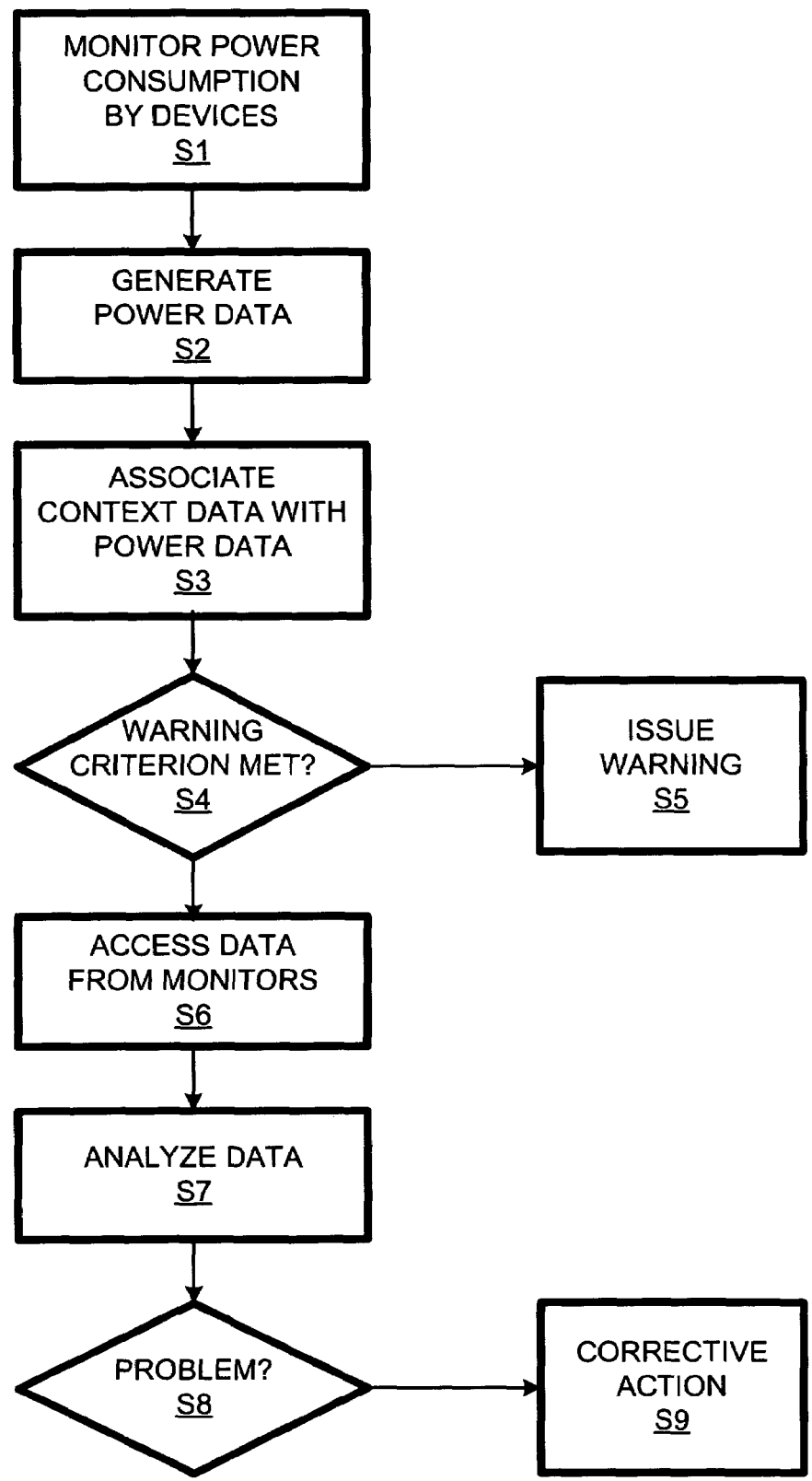
FIG. 2 is a flow chart of one of many methods within the scope of the invention.

Of the many possible methods provided by the invention, method M1, flow charted in FIG. 2, begins with power-consumption monitors 21-29 monitoring power consumption by their respective devices at method segment S1. Each monitor includes one or more sensors that are coupled to ground and to power; each sensor outputs an analog voltage corresponding to a rate of power consumption. Each analog voltage is converted to digital form to provide power-consumption data at step S2. In an alternative embodiment, some processing and combining of signals occurs in the analog domain. In the illustrated embodiment, analog sensor outputs are amplified but otherwise not processed or combined before being digitized.

At method segment S3, monitors 21-29 associate power-consumption data with context data such as time and device configuration. The device configuration data is, of course, device dependent. If there are multiple modes of operation, the mode can be indicated. In the case of an interface device, the nature of any connected device can be indicated. Method segment S3 can performed periodically so that, at any given time a power monitor can store several sets of associated power-consumption data that collectively define a recent power-consumption history for the monitored device.

Method segment S4 provides for determining whether a warning criterion is met. If the criterion is met, a warning can be issued at method segment S5. The criterion can be as simple as exceeding a predetermined power-consumption level once. Alternatively, the warning can involve exceeding a power-consumption for a predetermined number of sample times. More complex criteria are also provided for: e.g., different threshold levels can be applied for different devices modes. For example, high power consumption by a processor in a low-power mode might trigger a warning at a lower level than high power consumption by a processor in a high-performance mode. The warning can involve an interrupt signal or some digital data message.

Whether or not a warning is issued, power arbiter 51 accesses power consumption data from the various monitors at method segment S6. Accesses can be periodic and preferably are slightly staggered across devices. If a power monitor issues a warning, power budget arbiter 51 can be configured to respond immediately by collecting a power-consumption profile. Also, power data can be obtained in response to a user command—e.g., in preparation for a reconfiguration or upgrade to determine whether there is headroom for an upgraded or additional device. In an alternative embodiment, some power monitors are accessed more frequently than others since some devices, e.g., some I/O devices, are more variable in the amount of power they consume.

The power consumption profiles are analyzed at method segment S7. The power consumption data can be combined to determine total power consumption. Nominal or expected values can be added for devices that are not monitored. Successive profiles can be analyzed to obtain trend data. Also, power data can be analyzed so that power consumption can be evaluated as a function of device configuration, for example.

The analysis at method segment S7 can lead to detection of a problem at method segment S8. For example, if the total power-consumption reported by the monitors hovers near the system maximum for some predetermined duration, a failure can be predicted. According, some action can be taken at method segment S9; for example, in response to a warning, a system or derivative clock rate can be lowered, some device or functional component of a device inactivated, and/or a warning displayed to a user or administrator. In response to a user query in anticipation of an upgrade, a message can be displayed indicated whether there is sufficient spare capacity for the additional power consumption that would be expected if the upgrade is performed. Automatic actions and user or administrator actions are provided for.

Other possible method segment S9 actions can involve setting new thresholds within power budget arbiter 51 so that it responds differently to specific power consumption data. Also, power budget arbiter 51 can reconfigure one or more power monitors, e.g., to change the criterion for issuing a warning. For example, if an additional I/O device is added, less power may be available for a pre-existing I/O device; in this case, the warning threshold for the corresponding power monitor can be lowered.

The invention provides for devices (processors, memory modules, interface modules) with built-in power monitors. Having a power monitor built in ensures the greatest accuracy and the best match between device features and context data associated with power consumption data. In addition, connections between the power monitor and the rest of the device are not constrained by the limited number of interface pins (or other conductors) available.

The invention also provides for power monitors that are distinct from the devices they monitor. Separate monitors can monitor interconnects such as pins and other connectors between a device and a host motherboard, daughterboard, or other mating device. The use of distinct monitors allows the use of standard components that typically lack built-in power monitors, resulting in greater choice in selecting components. An economic savings can result as the devices can be less expensive to manufacture and may take advantage of the economies of scale. Since the distinct monitors are less tailored to individual devices, they can be more standardized, making easier for power budgeter software to accommodate their data. Of course, this advantage is greatly reduced in systems with mixed discrete and integrated power monitors.

Another advantage of discrete monitors is that one monitor can be used to monitor multiple devices. For example, one monitor can serve multiple memory modules. This can simplify design and save space, e.g., on a motherboard. Also, it is easier to coordinate data collection from a single monitor versus multiple monitors.

The invention provides for a mix of monitored and unmonitored devices. Of course, if the power supply is monitored, some inference can be made regarding power consumption by unmonitored devices. Also, nominal power ratings can be used as expected power consumption values. On the other hand, the more devices that are monitored, the more flexibility there is to budget power as a function of actual usage.

The invention provides for more flexible computer design. For example, rather than limit a design to ensure demand for power does not exceed supply, additional capability and expandability can be provided for as demand can be regulated in use. Thus, for example, additional processors, memory modules, and interface modules can be permitted as long as they are not all run at maximum power at the same time. When the system approaches available maximum power, steps can be taken to reduce power consumption. For example, certain functionality can be reduced or performance limited (e.g., by lowering clock rates). While there is a penalty associated with such measures, such penalties may be preferable to permanent limits on performance.

While the invention applies to computers with relatively few components, it provides a greater advantage for systems with greater numbers of monitored components as there is more flexibility in shifting power budgets among components, e.g., multiple processors, several memory modules, redundant interface modules, etc. These and other variations upon and modifications to the present invention are provided for by the present invention as defined by the following claims.

What is claimed is:

1. A computer system comprising:
   plural sets of devices, said devices including at least one processor;
   plural power consumption monitors, each of which generates and time stamps power-consumption data representing power consumption by a respective one of said sets; and
   a power budget arbiter for making a determination whether a collective power-consumption criterion is met for said sets collectively at least in part as a function of said power consumption data;
   wherein said power budget aribiter causes a mode of at least one of said set of devices to changes so as to achieve a different performance-versus power-consumption tradeoff in response to a determination that said criterion is met.

2. A computer system as recited in claim 1 wherein at least one of said power monitors is integrated into one of said devices.

3. A computer system as recited in claim 1 further comprising a connector to which a first of said devices is attached, a first of said power-consumption monitors generating power-consumption data as a function of currents through said connector so that, if said first device is replaced with a second device, said power-consumption monitor generates power-consumption data relating to said second device.

4. A computer system as recited in claim 3 wherein said connector is a socket or a slot.

5. A computer system as recited in claim 1 wherein said determination involves, at least in part, a determination of whether a predetermined fraction of a collective power budget is being exceeded.

6. A method comprising:
   generating power-consumption data for each of plural sets of devices incorporated in a computer using respective power-consumption monitors electrically connected to said devices;
   combining the data across said sets to determine whether or not some collective criterion is met; and indicating when said collective criterion is met; and
   changing a mode of a least one of said set of devices to change a tradeoff between power consumption and performance.

7. A method as recited in claim 6 wherein said collective criterion requires that a predetermined fraction of a power budget be allocated.

8. A method as recited in claim 6 further comprising:
   identifying a first of said devices as consuming excessive power; and
   inactivating said first device.

9. A method as recited in claim 8 further comprising replacing said first device with a second device that consumes less power.

10. Computer readable media comprising a program, when executed by a processor, collects time-stamped power consumption data for plural sets of devices and indicates when a collective criterion for such power consumption data is met;
    wherein said program includes a routine that, when executed, causes at least one of said set of devices to change a tradeoff between power consumption and performance.

11. Computer-readable storage media as recited in claim 10 wherein said criterion requires that a predetermined fraction of a power budget be allocated.

* * * * *

UNITED STATES PATENT AND TRADEMARK OFFICE
CERTIFICATE OF CORRECTION

| | | |
|---|---|---|
| PATENT NO. | : 7,536,573 B2 | Page 1 of 1 |
| APPLICATION NO. | : 11/193211 | |
| DATED | : May 19, 2009 | |
| INVENTOR(S) | : Derek Steven Schumacher et al. | |

It is certified that error appears in the above-identified patent and that said Letters Patent is hereby corrected as shown below:

In column 5, line 18, in Claim 1, delete "time stamps" and insert -- time-stamps --, therefor.

In column 5, line 25, in Claim 1, delete "aribiter" and insert -- arbiter --, therefor.

In column 5, line 26, in Claim 1, delete "changes" and insert -- change --, therefor.

In column 5, line 27, in Claim 1, delete "versus power" and insert -- versus-power --, therefor.

In column 6, line 8, in Claim 6, after "generating" insert -- and time-stamping --.

In column 6, line 10, in Claim 6, delete "connected" and insert -- connect --, therefor.

In column 6, line 15, in Claim 6, delete "a" and insert -- at --, therefor.

In column 6, line 28, in Claim 10, delete "Computer readable media" and insert -- Computer-readable storage media --, therefor.

Signed and Sealed this

Thirtieth Day of March, 2010

David J. Kappos
*Director of the United States Patent and Trademark Office*